May 28, 1963
O. E. SAARI
3,091,021
GEAR CUTTER FOR SKEW-AXIS GEARS
Filed May 9, 1958
3 Sheets-Sheet 1
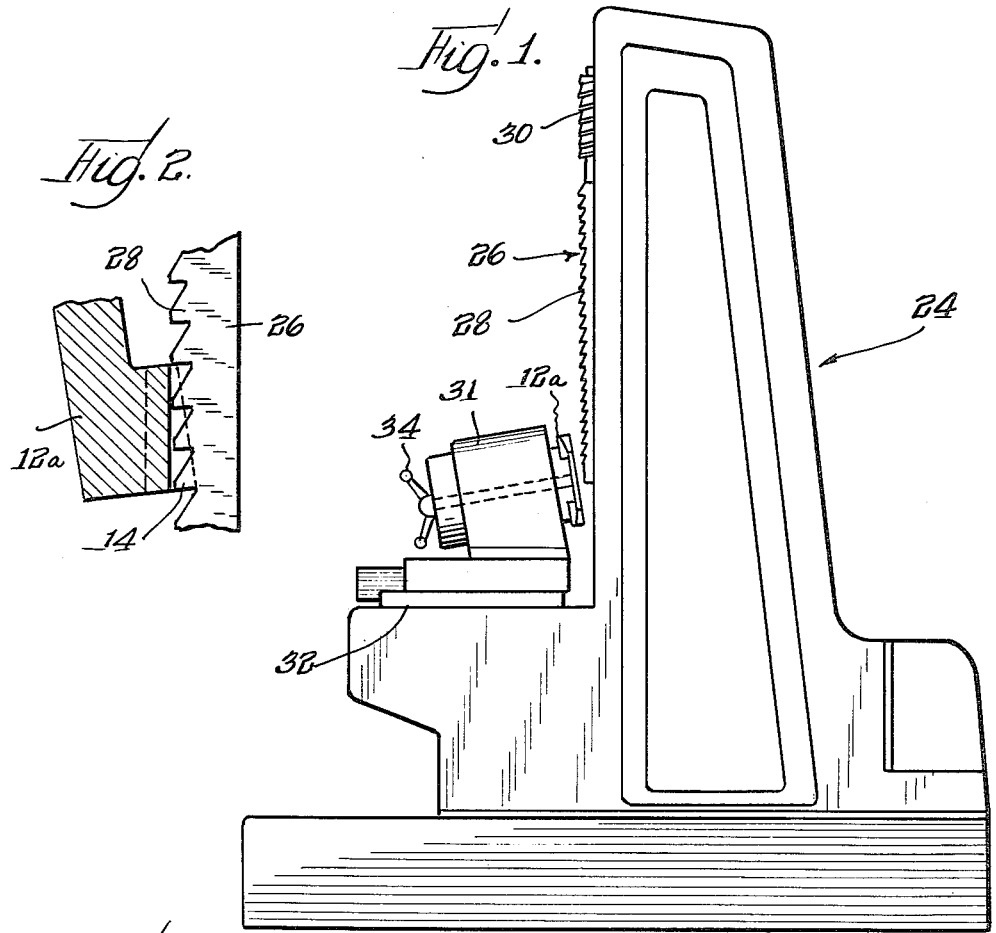
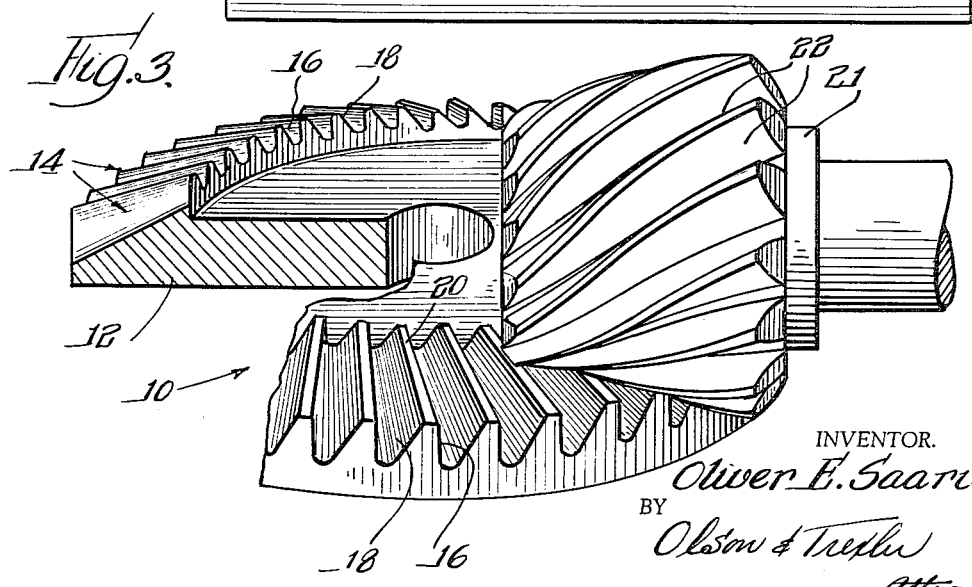
INVENTOR.
Oliver E. Saari
BY
Olson & Trexler
Attys.

INVENTOR.
Oliver E. Saari
By: Olson & Trexler attys.

May 28, 1963 O. E. SAARI 3,091,021
GEAR CUTTER FOR SKEW-AXIS GEARS
Filed May 9, 1958 3 Sheets-Sheet 3

INVENTOR.
Oliver E. Saari
By: Olson & Trexler
attys.

United States Patent Office 3,091,021
Patented May 28, 1963

3,091,021
GEAR CUTTER FOR SKEW-AXIS GEARS
Oliver E. Saari, Schiller Park, Ill., assignor to Illinois Tool Works Inc., a corporation of Delaware
Filed May 9, 1958, Ser. No. 734,221
13 Claims. (Cl. 29—105)

This invention relates generally to the art of gear formation, and more particularly to the formation of skew-axis gearing, that is, gearing in which the axes of the mating gears are neither parallel nor intersecting.

My prior Patent 2,776,578 discloses an improved form of skew-axis gearing. As is set forth in that patent, there is a "relative velocity vector" which indicates the direction of the relative movement of two cognate surfaces of revolution at a point on the line of contact. A spiral curve drawn on the outer surface of the smaller or driving member, hereinafter termed the worm or pinion, intersects the line of contact between the worm and its cognate surface at successive points on the line of contact as the surfaces rotate. There is only one such spiral which is tangent to the relative velocity vector at each point at which it intersects the line of contact. This spiral curve, as set forth in my aforesaid patent, has been called the "relative velocity vector spiral." In my aforesaid Patent 2,776,578, the worm is considered to be the primary member, and the relative velocity vector spiral is substantially duplicated on the worm. A hob similar to the worm is used for generating the gear. In accordance with my prior Patent 2,696,125, the relative velocity vector spiral is closely approximated on the worm to provide a worm of uniform taper and uniform lead. Again, a hob similar to the worm is used for generating the gear.

In accordance with my copending patent application Serial No. 687,504 for "Skew Axis Gearing with Plane Tooth Gear," filed October 1 1957, now Patent No. 2,896,467, issued May 30, 1961, the gear is considered to be the primary member rather than the worm. The gear has a tooth form corresponding to the relative velocity vector spiral, and this tooth form can be expressed mathematically. The mathematical considerations are full set forth in my aforesaid copending patent application, and the disclosure of that application is now incorporated herein by reference. Under certain conditions, an approximation can be made to the gear tooth curve which very closely approximates the ideal curve corresponding to the relative velocity vector spiral, producing a gear tooth of simple and effective form.

More specifically, there is a combination of offsets, reduction ratio, and gear pitch cone wherein the aforesaid ideal tooth curve on the gear is an S-shaped curve. At the point of inflection or reversal, it is a curve of infinite radius. Thus, the ideal tooth curve on the gear can be closely approximated by a straight gear tooth. Other considerations enter into the design of the gear. In particular, the gear teeth must be strong, and a sweeping action must occur between mating teeth.

There is a limit pressure angle at which sweeping of the contact lines between the gears ceases. At this limit pressure angle, the contact line is stationary, and only a small amount of power can be transmitted. For efficient contact and maximum power transfer, the actual tooth pressure angles differ from the limit pressure angle by substantially equal, rather large amounts, preferably as much as twenty degrees, and not less than ten degrees. In most practical cases, the resulting pressure angles of the gear tooth faces are unsymmetrical, although symmetrical about the limit pressure angle.

In view of the foregoing, it is an object of this invention to provide improved apparatus for fabricating gears of the type heretofore discussed.

In particular, it is an object of this invention to provide improved means for broaching gears of the type heretofore outlined.

Since the gear, rather than the worm or the pinion, is considered to be the primary member, it will be appreciated that a pinion could be generated by suitably gashing a gear to act as a hob. However, this presents substantial problems. It is difficult to gash the gear properly, initial relieving adjacent the cutting edges so provided is extremely difficult, and subsequent shapening is even more difficult.

Accordingly, it is an object of this invention to provide a gear cutter utilizing a plurality of inserted cutting blades so formed as to simulate a gashed gear hob.

More particularly, it is an object of this invention to provide such an inserted blade cutter wherein there is a plurality of multitoothed blades, each of said blades being identical.

Yet another object of this invention is to provide a gear cutter in accordance with the preceding object wherein a stepped or cam formation is provided successively to offset adjacent cutter blades.

Yet another object of this invention is to provide improved means for holding a plurality of cutter blades in a base to form a gear cutter.

Other and further objects and advantages of the present invention will be apparent from the following description when taken in connection with the following drawings, wherein:

FIG. 1 is an elevational view of a broaching machine for producing the gears;

FIG. 2 is a detail view of the broach and blank being formed into a gear;

FIG. 3 is a skew-axis gear set of the type herein under consideration, the view being in perspective;

Figure 4:
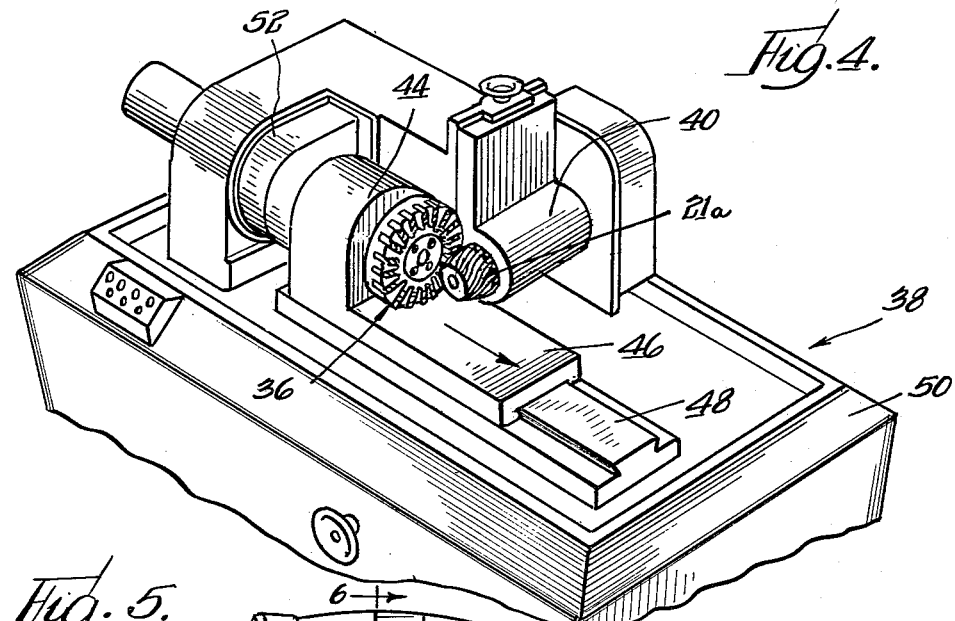
FIG. 4 is a perspective view of a pinion forming or hobbing machine utilizing the principles of this invention.

Reference first should be had to FIG. 3, wherein there is shown a skew-axis gear set identified generally by the numeral 10. The gear set comprises a gear 12 having crown teeth 14 about the periphery thereof. As will be observed, the teeth are formed by planes 16 on the driving side thereof, and by planes 18 on the coast side. The tips of the teeth are truncated at 20. The pressure angles of the teeth are unsymmetrical, the driving sides or faces 16 being more nearly parallel to the axis of the gear than are the coast sides or faces 18. However, these pressure angles are substantially symmetrical about the limit pressure angle.

The upper ends or tips 20 of the teeth may lie on a plane, or on the surface of a frustum of a cone. In the more general case, the surface is conical. Furthermore, the teeth may be arranged radially, or nonradially, the more general case being nonradial.

The gear 12 meshes with a pinion 21 having teeth 22 thereon. The pinion is formed to be complementary to the gear 12, and hence to mesh therewith in driving relation.

Apparatus for forming a gear 12 is shown in FIGS. 1 and 2. Such apparatus includes a broaching machine 24 which may be of more or less known construction. The broaching machine 24 is provided with a vertically movable broach 26. The broach is provided with a roughing section 28 of considerable length, and having a plurality of teeth, and with a finishing section 30 spaced above the roughing section, but integral therewith, and having a lesser number of teeth. The teeth of the roughing section 28 are of progressively increasing depth, so as to remove progressively greater amounts of metal from a gear blank. The finishing broach section 30 includes a much smaller number of teeth, and the teeth are all of substantially the same depth, since only a very small amount of metal is removed in finishing.

A gear blank 12a is mounted so as to be operated upon by the broach 26 during its vertically downward stroke. The gear blank is mounted on a fixture 31 on a shelf 32 or the like of the broaching machine, and is provided with suitable means, including a hand lever 34, for indexing the blank 12a. The axis of the blank generally is inclined at a shallow angle to the horizontal, and the broach cuts the blank from the inside out to form the teeth 14, shown as partially formed in FIG. 2, and as completely formed in FIG. 1 but with the broach raised or retracted.

The broach may be operated mechanically, but is preferably operated hydraulically in accordance with known constructions. The broach is first moved rapidly to move the roughing section thereof through the gear blank 12a, and then is moved slowly to move the finishing section thereof through the partially formed blank in order to provide properly finished and dimensioned teeth. As will be apparent, the movement of the broach is parallel to the valleys at the roots of the teeth.

As has been suggested heretofore, the configuration of the pinion or worm follows from that of the gear. In accordance with the principles of this invention a cutter 36 is provided, the cutter simulating the form of the finished gear 12. The construction of the cutter will be set forth hereinafter in detail, and reference first should be had to FIG. 4 for a showing of the use of the cutter. As shown in FIG. 4, a hobbing machine 38 operating on known principles is utilized for cutting the pinion. More particularly, the pinion blank 21a is mounted on a shaft held in a boss 40 and is driven by suitable drive mechanism (not shown). The cutter 36 is mounted on a shaft driven in timed relation to the pinion blank shaft. The shaft is mounted adjacent the cutter 36 in a standard 44 on a sliding bed 46 received on a dovetail 48 on the pedestal 50 of the hobbing machine 38. The rear end of the shaft is journalled in a support 52, and the shaft preferably is of a splined or otherwise telescoping construction to allow the cutter 36 to be fed toward the blank 21a as the cutter and blank are rotated. More particularly, the cutter is advanced by movement of the sliding bed 46, such movement being effected in any known manner, such as by a suitable hydraulic mechanism. In accordance with the principles of this invention the advance of the cutter comprises a fast approach to bring it into contact with the pinion blank, followed by a relatively rapid rough cut, followed by a dwell for the finish cut, and finally by a retracting step.

Figure 5:
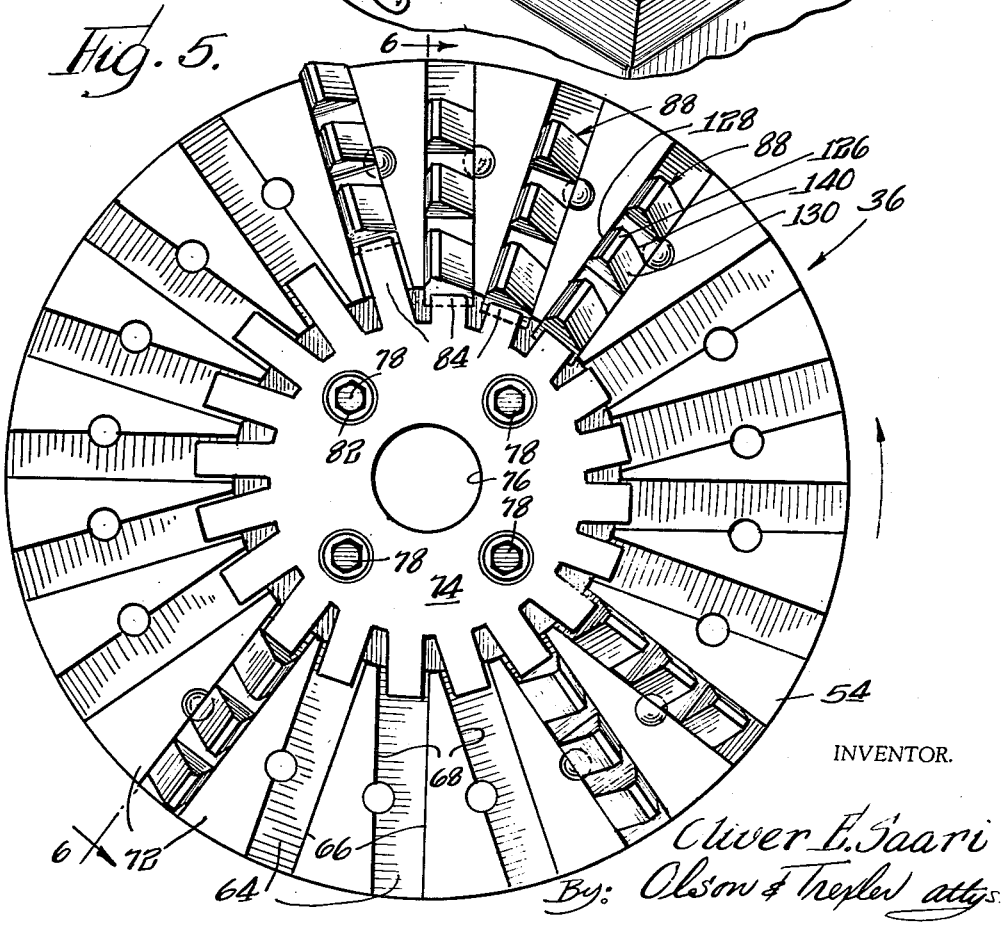
FIG. 5 is a plan view of the cutter for forming the pinions.
Figure 6:
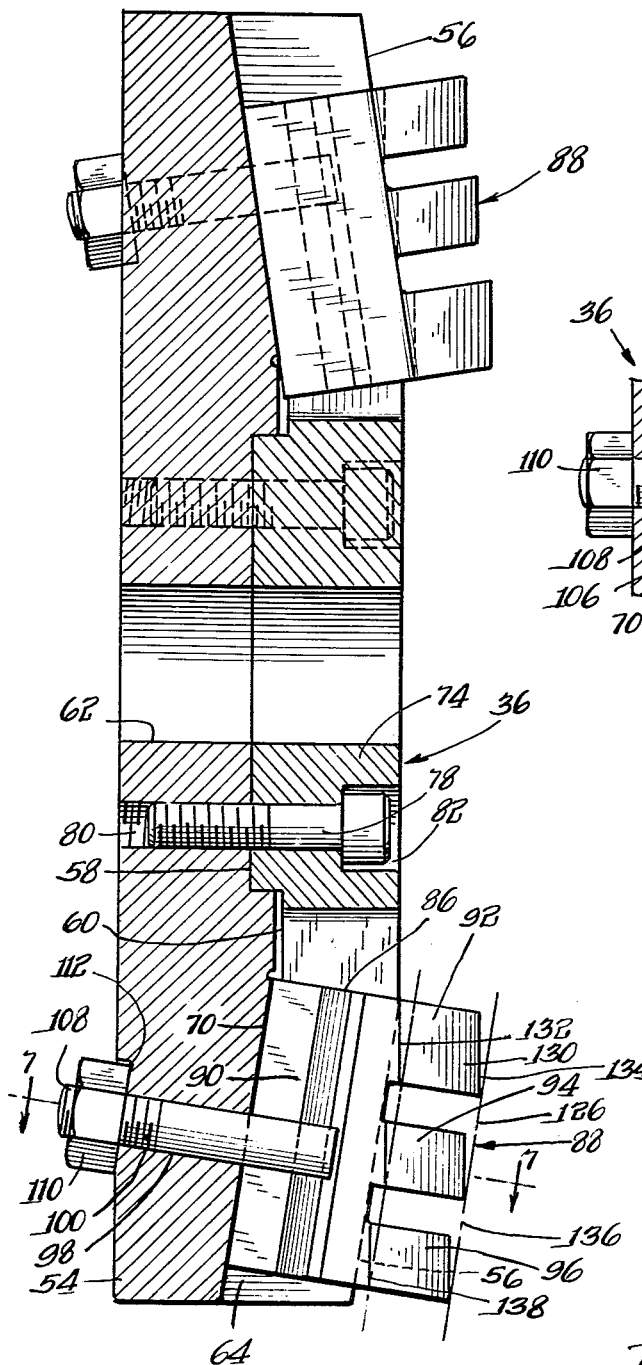
FIG. 6 is an axial sectional view through the cutter as taken substantially along the line 6—6 in FIG. 5.
Figure 7:
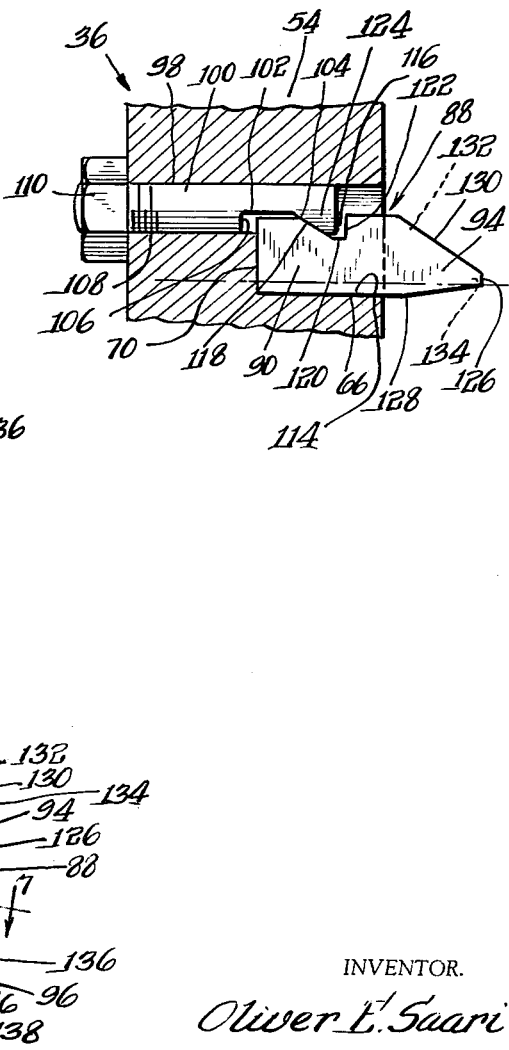
FIG. 7 is a detail cross sectional view taken substantially along the line 7—7 in FIG. 6.

The cutter 36 is shown in greater particularity in FIGS. 5–7, and comprises a base 54 in the form of a disc. The base is provided with a frusto-conical surface 56 adjacent its outer periphery, and with a central recess 58 countersunk at 60. An axial bore 62 also extends through the base. The frusto-conical surface 56 is provided with a plurality of generally radial slots 64. The intention here is to have all the cutting edges of the blades aligned as closely as possible with the plane tooth flanks of an imaginary gear, geometrically similar to the gear that is to mesh with the pinion being cut. The aligning of the blades is made easier if the slots 64, which retain them, are parallel to the line of intersection of the theoretical plane tooth forms, because then the endwise position of any given blade in a given slot becomes unimportant. (A little reflection will show that moving the blade along the slot does not change the planes in which the cutting edges lie.) This allows a series of identical blades to be positioned in their various slots so as to provide a staggering of the cutting edges without in any way affecting the accuracy to tooth spacing which is built into the slots in the body 54.

The cutter 36 also includes a locator hub 74. The locator hub is mounted within the recess 58 and countersink 60, and has an axial bore 76. The hub is detachably held in place by means of a plurality of bolts 78 threaded into suitable tapped apertures 80 in the base 54, the bolt heads being received in countersinks 82. The locator hub 74 further is provided with a plurality of fingers 84 respectively aligned with the various slots 64. In the illustrative embodiment of the invention, there are twenty such fingers and slots. The fingers are of increasing length, the outer ends thereof lying substantially on a spiral of increasing diameter. Hence, some of the shorter fingers terminate short of the ends of the blocks 72, while most of the fingers extend beyond the inner ends of the blocks into the slots 64. The ends of the fingers are squared off in plan view, as in FIG. 5, and are provided with plane undercut faces 86 in axial section, as in FIG. 6. The faces 86 are perpendicular to the bottom surfaces 70 of the slots 64.

The cutter 36 further comprises a plurality of cutting blades 88 respectively received in the slots 64, there being one blade per slot. All of the blades 88 are identical, and are successively offset by the fingers 84, in a manner shortly to be described. Each blade 88 comprises a body 90 of generally rectangular configuration and received in one of the slots 64. The body at the inner end abuts the face 86 of the corresponding finger 84. Each blade is provided with a plurality of teeth, three being illustrated, and being identified as 92, 94 and 96 respectively. The particular configuration and disposition of the teeth will be set forth hereinafter in greater detail, but in general it will be observed that the plurality of teeth together correspond to one of the teeth 14 of the gear 12.

Means is provided for detachably securing each cutting blade 88 in position in the corresponding recess or groove 64. Such means comprises a bore 98 overlapping each recess, groove or slot 64 and receiving a stud 100. Each stud is provided in its entering end with a chordal flat or slot 102 joined to a cam surface 104 extending to the outer diameter of the stud near the extreme entering end. The cam surface 104 and chordal slot 102 define a recess together with surface 106 which is preferably transversely disposed to surface 102. The opposite end of each stud is threaded at 108, and a nut 110 is threaded thereon, the undersurface of the base 54 being partially countersunk to provide a flat surface 112 against which the underface of the nut bears.

The face 114 of each blade body which bears against the leading edge 66 of the slot in which the blade is received serves as a basic locating face, while the bottom edge of the blade bearing against the bottom surface 70 forms the bottom locating surface of the blade. The back face of the blade body is provided with a longitudinal recess 116 (approximately radial of the cutter). This recess is defined by a cam face 118 complementary to the cam surface 104 of the stud, and also by an inner surface 120, and an upper terminating surface 122. The surface 120 extends into the blade a somewhat greater distance than does the tooth-like segment 124 of the stud. Furthermore, the entering end of the stud normally is spaced from the surface 122, while the bottom surface of the blade is short of the surface 106 of the stud. Accordingly, when the nut 110 is loosened on the stud 100, the cutting blade 88 can be slid radially in or out of the cutter. However, when the nut 110 is tightened on the stud 100 with a cutting blade in place, the surface 104 bears against the surface 118, and wedges the blade body tightly against the surfaces 66 and 70. The cutting blade thus is held properly in place. As will be brought out more fully hereinafter, the reaction forces in cutting are such as to force the blades radially inward against the fingers 84, and the fingers provide a solid locating base preventing any sliding of the blade radially.

As noted heretofore, there may be more or less than the three teeth per blade illustrated. The number of teeth is primarily effective in determining the fineness of the finished surface. In general, the larger the number of teeth the finer the finished surface. The teeth 92, 94 and 96 are substantially identical, although in the present example the tooth 92 is of somewhat greater radial dimension. As best may be seen in FIG. 7, each tooth is more or less wedge-shaped, having a flat outer end 126 (see also FIG. 7), a slightly backwardly leaning leading or front face 128 and a forwardly leaning trailing or rear face 130. The front faces 128 of all of the teeth correspond to the drive sides 16 of the gear teeth 14, and the trailing faces 130 generally correspond to the coast sides 18 of the teeth, but differ therefrom slightly due to relief as indicated at 132. Similarly, the outer ends 126 correspond to the tips 20 of the teeth 14, except for relief thereof as indicated at 134. More particularly, as indicated in FIG. 6, the interrupted line 136 containing the extremities of the tooth tips 126 corresponds to the tooth tips 20. The cutting edges must extend to a sufficient depth to represent the entire conjugate part of the gear tooth, and may extend beyond to any convenient distance as, for example, to the interrupted line 138. Line 136 is parallel to the bottom locating surface 70, as will be apparent. The angle of relief is determined in accordance with various requirements well understood in the gear cutting art, such as type of metal being cut, the speed of shaving, etc. The outer trailing edges 140 (FIG. 5) constitute the cutting edges, and the reaction forces are such that the blades are forced radially in against the flat seats 86 comprising the outer faces of the fingers 84.

As noted heretofore, there are twenty cutting blades in the illustrative embodiment. The outer ends of the fingers of the locator hub lie approximately on a spiral of increasing diameter, as heretofore noted. The step from one finger to another is equal in each instance, and the total stepping is one part less than the space between the cutting edges of adjacent teeth on a cutter blade. Thus, in the illustrative embodiment of twenty blades, the total step is $19/20$ of the space between adjacent cutting edges. Accordingly, the pinion blank is never engaged in exactly the same place by any two edges. Every blade goes through every tooth of the pinion formed, and the number of teeth to the cutter and the number of teeth to the pinion have no common factor. As noted, the steps from the tips of the fingers preferably are equal. However, if they are not exact, the finished result need not necessarily be imperfect in any way. The spacing affects only the location of the cuts, due to the identical nature of the cutters. A relatively coarse or rough cut will be made with three teeth, as illustrated. However, it is a simple matter to form the cutting blades with additional teeth to provide a finer finish. The same cutter base would be used with greater number of teeth, but the locating hub would be changed due to the required difference in step from one finger tip to another. A separate cutter might be used for finishing, and in this instance relieving of the teeth would not be absolutely necessary, due to the small amount of metal to be removed.

As now will be appreciated, the spaces between adjacent teeth of the cutting blades simulate gashes in the teeth of the gear. These gashes, in the illustrative example, are of a spiral nature, but could be involute gashes. Although the specific illustration is of a gear and of a cutter having radially disposed teeth, it is apparent that the teeth could be skewed from radial. Similarly, the gear could be a flat gear, rather than the frusto-conical gear disclosed.

Since all of the cutting blades are identical, initial formation and subsequent sharpening is a simple matter. All of the blades of a given cutter can be clamped in a jig or fixture, and can be formed or sharpened simultaneously. As will be appreciated, this constitutes a major simplification relative to simply gashing a gear to form a cutter.

The number of cutting blades in the cutter is approximately one-half of the number of teeth in the corresponding gear, or perhaps somewhat less. The reason for this is that a certain amount of cutter base must be left between adjacent cutting blades to secure and position the blades.

From the foregoing it will now be apparent that improved apparatus has been provided for forming the gears of a skew-axis gear set. The apparatus for initially forming the gears utilizes known principles of broaching machines, but adds the broaching of face type gears, more particularly from the inside out, and the rough and finish broaching in a single operation. The inserted tooth cutter for forming the pinion cooperable with the gear is of simple and rugged construction, and is easy to fabricate and to sharpen after use.

The specific details herein disclosed are exemplarly only, and various changes in structure will no doubt occur to those skilled in the art. Such changes are to be considered a part of the invention insofar as they fall within the spirit and scope of the appended claims.

The invention is claimed as follows:

1. A gear cutting device comprising a body having a plurality of generally radially aligned slots opening axially thereof, a like plurality of cutter blades respectively disposed in said slots and each having a plurality of teeth exposed substantially axially of said body, all of said blades being substantially identical, and common locating means disposed centrally of said body and abutted by said blades, said locating means spacing successive blades successively greater distances radially outwardly.

2. A gear cutting device as set forth in claim 1, wherein the common locating means has a plurality of seats against which said cutter blades respectively abut, said seats lying substantially on a spiral of increasing diameter.

3. A gear cutting device as set forth in claim 2, wherein the seats are flat.

4. A gear cutting device comprising a body, a plurality of cutter blades, all of said blades being identical and having a plurality of teeth thereon, and means securing said blades in substantially equally arcuately spaced relation on said body in substantially radial disposition with successive blades being disposed successively greater distances radially outwardly, the teeth of said blade extending substantially axially from said body, and the envelope of the axially oriented cutting edges of said teeth extending axially of the radially inner ends of the teeth at least as far as at the radially outer ends thereof.

5. A gear cutting device comprising a disc-like base having a central recess and having a plurality of slots radiating outwardly therefrom and opening axially thereof, said slots communicating with said recess, a like plurality of cutter blades respectively disposed in said slots and each having a plurality of teeth exposed substantially axially of said base, all of said blades being substantially identical, and a locator hub detachably mounted in said recess and abutted by said blades, said hub spacing successive blades successively greater distances radially outwardly.

6. A gear cutting device as set forth in claim 5, wherein the locator hub has a plurality of generally radial projections thereon providing seats against which said blades abut.

7. A gear cutting device as set forth in claim 6, wherein the ends of the projections are flat, thereby providing flat seats for said blades.

8. A gear cutting device as set forth in claim 6, wherein the number of projections is the same as the number of slots, said projections and said slots being aligned substantially radially, successive ones of said projections being longer, and at least some of said projections being received in said slots.

9. A gear cutting device comprising a body having a plurality of generally radially disposed slots opening axially thereof, a like plurality of cutter blades each of which is substantially identical respectively disposed in said slots and each having a plurality of teeth exposed substantially axially of said body, said teeth being spaced longitudinally of said body and the outline of all of said teeth corresponding to a flat tooth of a face type worm gear, the tip of each tooth being generally wedge-shaped and tilted slightly backwards on the leading face and tilted forwards a greater degree on the trailing face, and locating means disposed centrally of said body and abutted by said blades, said locating means spacing successive blades successively greater distances radially outwardly.

10. A gear cutting device as set forth in claim 9, wherein each tooth is relieved along the top thereof radially inwardly from the outer extremity thereof, and on the back face thereof radially inwardly from the outer extremity thereof.

11. A gear cutting device comprising a body having a plurality of generally radially aligned slots opening axially and radially thereof, a like plurality of cutter blades respectively disposed in said slots and each having a plurality of teeth exposed substantially axially of said body, all of said blades being substantially identical, each of said blades having a recess in a radially disposed face thereof extending radially substantially from end to end thereof, retaining means in said body separably received in said recesses of said blades detachably to secure said blades in said slots, all of said retaining means being uniformly positioned radially of said body, and locating means disposed centrally of said body and abutted by said blades, said locating means spacing successive blades successively greater distances radially outwardly.

12. A gear cutting device as set forth in claim 11, wherein the recesses in the blades comprise longitudinal recesses opening at the radial inner ends of the blades, said recesses having cam surfaces thereon, and the retaining means having complementary cam surfaces to wedge said blades in place.

13. A gear cutting device as set forth in claim 12, wherein the retaining means comprises a plurality of threaded studs having nuts thereon and respectively associated with said blades.

References Cited in the file of this patent

UNITED STATES PATENTS

| | | |
|---|---|---|
| 1,168,356 | Weaver | Jan. 18, 1916 |
| 1,274,466 | Stewart et al. | Aug. 6, 1918 |
| 1,376,600 | Blackmore | May 3, 1921 |
| 1,409,766 | Perkins et al. | Mar. 14, 1922 |
| 1,486,604 | Perkins | Mar. 11, 1924 |
| 1,855,511 | Edgar | Apr. 26, 1932 |
| 1,973,133 | Adams | Sept. 11, 1934 |
| 2,346,807 | Wildhaber | Apr. 18, 1944 |
| 2,395,570 | McKenna | Feb. 26, 1946 |
| 2,444,551 | Bauer | July 6, 1948 |
| 2,456,842 | Rutbell | Dec. 21, 1948 |
| 2,564,551 | Vazieux et al. | Aug. 14, 1951 |
| 2,665,472 | Aschwanden et al. | Jan. 12, 1954 |
| 2,692,537 | Gleason et al. | Oct. 26, 1954 |

FOREIGN PATENTS

| | | |
|---|---|---|
| 900,132 | France | Sept. 18, 1944 |